United States Patent
Ito et al.

(10) Patent No.: US 11,015,593 B2
(45) Date of Patent: May 25, 2021

(54) IN-VEHICLE COMPRESSION DEVICE

(71) Applicant: HITACHI AUTOMOTIVE SYSTEMS, LTD., Ibaraki (JP)

(72) Inventors: Tsutomu Ito, Sagamihara (JP); Yoshinori Kawai, Ebina (JP); Kan Kobayashi, Yokohama (JP)

(73) Assignee: HITACHI ASTEMO, LTD., Ibaraki (JP)

( * ) Notice: Subject to any disclaimer, the term of this patent is extended or adjusted under 35 U.S.C. 154(b) by 193 days.

(21) Appl. No.: 16/303,760

(22) PCT Filed: May 16, 2017

(86) PCT No.: PCT/JP2017/018360
§ 371 (c)(1),
(2) Date: Nov. 21, 2018

(87) PCT Pub. No.: WO2017/204037
PCT Pub. Date: Nov. 30, 2017

(65) Prior Publication Data
US 2019/0085841 A1      Mar. 21, 2019

(30) Foreign Application Priority Data

May 26, 2016   (JP) .............................. JP2016-105122

(51) Int. Cl.
*F04B 49/12*   (2006.01)
*F04B 49/06*   (2006.01)
(Continued)

(52) U.S. Cl.
CPC .......... *F04B 49/12* (2013.01); *B60G 17/0155* (2013.01); *B60G 17/0165* (2013.01);
(Continued)

(58) Field of Classification Search
CPC .... F04D 25/0673; F04D 13/068; F04B 49/06; F04B 49/065; F04B 17/04–17/048;
(Continued)

(56) References Cited

U.S. PATENT DOCUMENTS

| | | | |
|---|---|---|---|
| 4,343,275 A * | 8/1982 | Brinkman | F02M 51/04 123/382 |
| 2003/0161734 A1 * | 8/2003 | Kim | F04B 35/045 417/44.1 |

(Continued)

FOREIGN PATENT DOCUMENTS

| | | |
|---|---|---|
| JP | 10-119530 | 5/1998 |
| JP | 2003-254251 | 9/2003 |

(Continued)

OTHER PUBLICATIONS

JP2008184131 English Translation, obtained from EPO website Jul. 30, 2020 (Year: 2020).*

(Continued)

*Primary Examiner* — Bryan M Lettman
(74) *Attorney, Agent, or Firm* — Wenderoth, Lind & Ponack, L.L.P.

(57) ABSTRACT

An in-vehicle compression device includes: a compressor including a cylinder and a piston that is slidably provided inside the cylinder and defines a compression chamber; a linear motor including a movable element reciprocatably connected to the piston; and a controller configured to control driving of the linear motor. The in-vehicle compression device is configured to supply a working fluid compressed in the compression chamber to a pressure device provided in a vehicle. The controller is configured to variably adjust a stroke of the piston according to a state of the vehicle.

3 Claims, 7 Drawing Sheets

(51) Int. Cl.
    *B60G 17/052*    (2006.01)
    *F04B 35/04*     (2006.01)
    *F04B 39/00*     (2006.01)
    *B60G 17/015*    (2006.01)
    *B60G 17/0165*   (2006.01)

(52) U.S. Cl.
    CPC ............ *B60G 17/052* (2013.01); *F04B 35/04* (2013.01); *F04B 35/045* (2013.01); *F04B 39/0027* (2013.01); *F04B 49/06* (2013.01); *B60G 2400/204* (2013.01); *B60G 2400/252* (2013.01); *B60G 2400/38* (2013.01); *B60G 2400/51222* (2013.01); *B60G 2400/823* (2013.01); *B60G 2500/205* (2013.01); *B60G 2500/30* (2013.01)

(58) Field of Classification Search
    CPC  F04B 35/045; F04B 2201/0206; F04B 49/12; F04B 39/0027; F04B 35/04; B60G 17/00–17/08; B60G 2400/51222; B60G 2400/252; B60G 2400/38; B60G 2400/204; B60G 2500/205; B60G 2400/823; B60G 2500/30
    See application file for complete search history.

(56) References Cited

U.S. PATENT DOCUMENTS

2010/0170239 A1    7/2010  Sora
2014/0199180 A1*   7/2014  Schoendorff ........... F04B 51/00
                                                       417/53

FOREIGN PATENT DOCUMENTS

JP       2008-184131          8/2008
JP       2008184131      *    8/2008
JP       2010-159648          7/2010

OTHER PUBLICATIONS

International Search Report dated Aug. 8, 2017 in International (PCT) Application No. PCT/JP2017/018360.

* cited by examiner

IN-VEHICLE COMPRESSION DEVICE

CROSS-REFERENCE TO RELATED APPLICATION

The present application claims priority to Japanese Patent Application No. 2016-105122 filed on May 26, 2016. All the contents disclosed in Japanese Patent Application No. 2016-105122 including the specification, the claims, the drawings, and the abstract are incorporated herein by reference in their entirety.

TECHNICAL FIELD

The present invention relates to an in-vehicle compression device that is installed in a vehicle, for example, a four-wheeled vehicle.

BACKGROUND ART

Some of vehicles including four-wheeled vehicles are equipped with an in-vehicle compression device that is used to adjust the vehicle height. This type of in-vehicle compression device includes a compressor, an electric motor that rotationally drives the compressor, and a controller that controls the rotation speed of the electric motor. In this case, the compressor generates compressed air by reciprocating a piston through a crank mechanism that is coupled to an output shaft of the electric motor.

When the engine speed is low, the controller stops the electric motor or drives the electric motor at low speed to thereby reduce noise of the compressor (e.g., see Japanese Patent Publication No. 2008-184131).

SUMMARY OF INVENTION

Technical Problem

If an in-vehicle battery has a low voltage and cannot supply a sufficient current when the engine speed is low or the engine is stopped, the in-vehicle compression device described in Japanese Patent Publication No. 2008-184131 may fail to operate the compressor (perform a compression operation).

An object of the present invention is to provide an in-vehicle compression device that allows a compressor to be operated at a low current, and operated with low noise and low vibration according to the state of a vehicle.

Solution to Problem

An in-vehicle compression device according to an embodiment of the present invention includes: a compressor including a cylinder and a piston that is slidably provided inside the cylinder and defines a compression chamber; a linear motor including a movable element reciprocatably connected to the piston; and a controller configured to control driving of the linear motor. The in-vehicle compression device is configured to supply a working fluid compressed in the compression chamber to a pressure device provided in a vehicle, and the controller is configured to variably adjust a stroke of the piston according to a state of the vehicle.

According to the embodiment of the present invention, it is possible to operate a compressor at a low current, and with low noise and low vibration according to the state of a vehicle.

DESCRIPTION OF EMBODIMENTS

An in-vehicle compression device according to an embodiment of the present invention will be described below in detail in accordance with the accompanying drawings.

Figure 1:
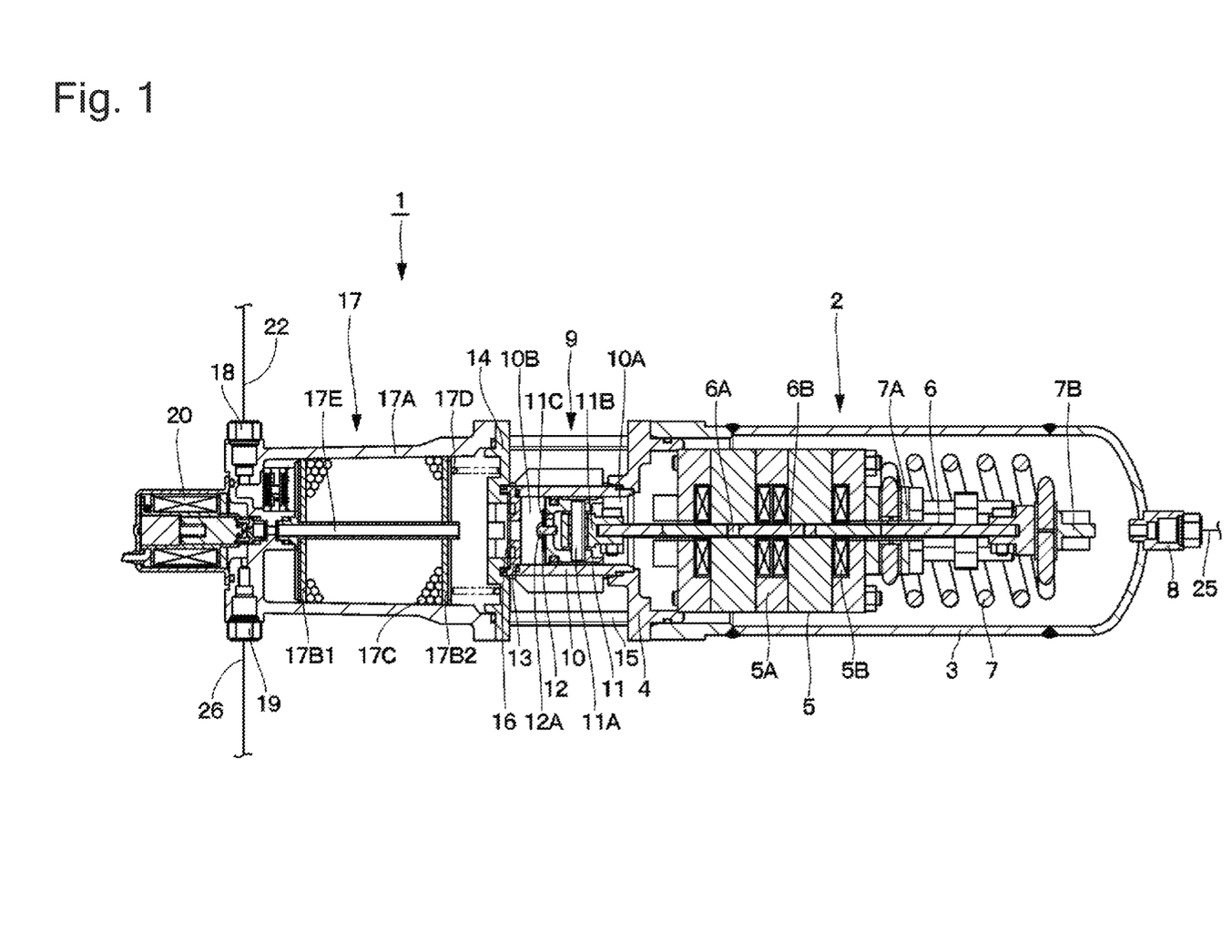
FIG. 1 is a sectional view showing the overall configuration of a compressor according to an embodiment.

In FIG. 1, a compressor 1 includes a linear motor 2, a compression portion 9 including a cylinder 10 and a piston 11, and an air dryer 17. Hereinafter, the side of the air dryer 17 of the compressor 1 (the left side in FIG. 1) and the side of the linear motor 2 of the compressor 1 (the right side in FIG. 1) will be referred to as a one end side and the other end side, respectively.

The linear motor 2 is located on the other end side of the compressor 1 and provided as a driving source for the compressor 1. The linear motor 2 includes a motor case 3 and a linear base 4 that form an outer shell of the linear motor 2, an armature 5, a movable element 6, a spring 7, etc. The linear motor 2 is connected to a controller 27 to be described later. As the controller 27 controls a current flowing through coils 5B of the armature 5, the linear motor 2 reciprocates the movable element 6 in an axial direction to generate a driving force for reciprocation on the piston 11.

The motor case 3 is formed as a hollow container made of a metal material, such as an aluminum material, and has a shape of a bottomed cylinder that is open at the one end side and closed at the other end side. The armature 5, the movable element 6, the spring 7, and the like are housed inside the motor case 3. The linear base 4 is engaged on the open end side of the motor case 3 so as to close the opening. In other words, the motor case 3 is fixed to the linear base 4 by screw fastening etc.

The armature 5 is provided as a fixed element and fixed inside the motor case 3. The armature 5 includes a core 5A that is formed, for example, by a powder magnetic core, stacked magnetic steel sheets, or a magnetic strip, and a plurality of coils 5B that is wound in a predetermined direction and housed inside the core 5A.

On the other hand, the movable element 6 is located on an inner circumferential side of the armature 5 and extends along an axial direction of the motor case 3 (the left-right direction in FIG. 1). Thus, the movable element 6 is disposed inside the motor case 3 along a central axis of the linear motor 2. The movable element 6 includes a yoke 6A that is formed by a magnetic body and has a flat plate shape, and a plurality of permanent magnets 6B that are disposed in a flat plate shape on a front side and a back side of the yoke 6A.

The movable element 6 reciprocates inside the motor case 3 as a current is applied to the coils 5B of the armature 5. The movable element 6 thereby causes the piston 11, to be described later, connected on the one end side of the movable element 6 to reciprocate. In this case, the extent of reciprocation (i.e., the length of stroke) of the movable element 6 is variably adjusted through control by the controller 27 to be described later.

The length of stroke of the movable element 6 can be adjusted by changing a value of a current passing through the coils 5B of the armature 5 so as, for example, to adjust a bottom dead center of the movable element 6 without changing a top dead center thereof, or to adjust the top dead center and the bottom dead center of the movable element 6. In this case, the top dead center of the movable element 6 refers to the farthest point on the one end side to which the movable element 6 travels, and the bottom dead center refers to the farthest point on the other end side to which the movable element 6 travels. Adjustment of the length of stroke of the movable element 6 by the controller 27 will be described later.

The spring 7 is located on the other side of the linear motor 2 and provided inside the motor case 3. One end side of the spring 7 is fixed on the one end side of the armature 5 using a coupling member 7A, and the other end side of the spring 7 is mounted, using a coupling member 7B, on the other end side of the movable element 6 so as to be movable in the axial direction. The spring 7 is formed, for example, by a compression coil spring, and is mounted so as to urge the movable element 6 toward the other end side of the compressor 1. In this case, the spring 7 expands and contracts in the axial direction as the movable element 6 reciprocates.

A suction port 8 is located on the other end side of the linear motor 2 and provided at a bottom of the motor case 3. During a suction stroke of the compressor 1, air is suctioned from outside into the motor case 3 through the suction port 8. The suction port 8 is connected to a suction pipeline 25 to be described later.

The compression portion 9 is provided at a position between the linear motor 2 and the air dryer 17. The compression portion 9 includes the cylinder 10, the piston 11, an intake valve 12, a valve plate 13, a cylinder head 14, and a discharge valve 16. The compression portion 9 generates compressed air (a working gas) by compressing outside air as the piston 11 is driven by the reciprocating movable element 6 of the linear motor 2.

The cylinder 10 is provided with one end side closed by the valve plate 13 and the other end side fixed to the linear base 4. The cylinder 10 is made of, for example, an aluminum material, and has a cylindrical shape, and the piston 11 is reciprocatably (slidably) housed inside the cylinder 10. Thus, the inside of the cylinder 10 is divided by the piston 11 into a non-compression chamber 10A communicating with the inside of the motor case 3 and a compression chamber 10B located on the side of the cylinder head 14.

The piston 11 is inserted and fitted such as to be reciprocatable inside the cylinder 10. The piston 11 divides the inside of the cylinder 10 into the non-compression chamber 10A and the compression chamber 10B. The piston 11 is connected on the one end side of the movable element 6 of the linear motor 2 through a piston pin 11A and a coupling member 11B. Thus, the piston 11 is provided so as to extend along the axial direction of the linear motor 2 (motor case 3). In other words, the piston 11 is disposed on an axis in a moving direction of the movable element 6 of the linear motor 2.

Accordingly, the piston 11 reciprocates inside the cylinder 10 in conjunction with reciprocation of the movable element 6. In this case, the length of stroke of the movable element 6 is variably controlled by the controller 27 to be described later. As a result, the length of stroke of the piston 11 inside the cylinder 10 is variably adjusted. Specifically, when the movable element 6 travels a full length of stroke, a larger amount of compressed air is supplied from inside the compression chamber 10B to air suspensions 21 through the air dryer 17 to be described later. Accordingly, an expanding action of the air suspensions 21 is promptly performed, and a vehicle height raising operation can be quickly performed.

On the other hand, when the movable element 6 travels a shorter length of stroke, a smaller amount of compressed air is supplied from inside the compression chamber 10B to the air suspensions 21 through the air dryer 17 to be described later, than when the movable element 6 travels the full length of stroke. In this case, noise of the compressor 1 can be reduced, as vibration thereof caused by reciprocation of the movable element 6 is reduced. Moreover, the compressor 1 can be operated even at a low battery voltage, as the current passing through the coils 5B of the armature 5 can be reduced.

The piston 11 is provided with a communication hole 11C through which the non-compression chamber 10A and the compression chamber 10B communicate with each other, and the intake valve 12 is fixed to the communication hole 11C with a screw 12A or by being swaged. The intake valve 12 opens the communication hole 11C during a suction stroke of the compressor 1 to establish communication between the non-compression chamber 10A and the compression chamber 10B, and closes the communication hole 11C during a compression stroke to block communication between the non-compression chamber 10A and the compression chamber 10B.

The valve plate 13 and the cylinder head 14 are mounted on the one end side of the cylinder 10 so as to close the one end side of the cylinder 10. The cylinder head 14 is engaged on the other end side of the air dryer 17 as a discharge portion through which compressed air is discharged, and thereby closes an opening of the air dryer 17 on the other end side. A plurality of fixing members 15 for fixing and holding the cylinder 10 between the cylinder head 14 and the linear base 4 is provided between the cylinder head 14 and the linear base 4.

The discharge valve 16 is provided at a position between the valve plate 13 and the cylinder head 14, and constitutes a reed valve that comes into contact with and away from the valve plate 13. The discharge valve 16 is formed by a circular thin plate having elasticity (springiness) and held between the valve plate 13 and the cylinder head 14. The discharge valve 16 seats on the valve plate 13 during a suction stroke of the compressor 1 to block communication between the compression chamber 10B and the inside of the air dryer 17, and comes away from the valve plate 13 during a compression stroke to establish communication between the compression chamber 10B and the inside of the air dryer 17.

The air dryer 17 is located on the one end side of the compressor 1 and provided on the opposite side of the compression portion 9 from the linear motor 2. In this case, the air dryer 17 is disposed in series such that an axial direction thereof coincides with an axial direction of the piston 11. In other words, an axis of the air dryer 17 and an axis of the piston 11 extend generally on the same straight line.

In yet other words, the air dryer 17 is disposed on the axis in the moving direction of the movable element 6 of the linear motor 2 and the piston 11. The air dryer 17 includes a housing 17A, filters 17B1, 17B2, a drying agent 17C, a spring 17D, and an exhaust pipe 17E. The air dryer 17 supplies compressed air in a dry state (dry air) when the compressed air is supplied from the compressor 1 to each air suspension 21 to be described later.

The housing 17A is formed as a hollow container made of a resin material, such as a resin, and has a shape of a bottomed cylinder that is closed at the one end side and open at the other end side. The other end side of the housing 17A is engaged with the cylinder head 14 and thus the open end of the housing 17A is closed. The inside of the housing 17A is divided by the filters 17B1, 17B2, and the drying agent 17C is filled between the filters 17B1, 17B2. The filters 17B1, 17B2 prevent the drying agent 17C from partially flowing to the outside. The spring 17D that urges the filter 17B2 at all times toward the one end side of the compressor 1 is provided between the filter 17B2 and the cylinder head 14. The housing 17A may be made of a metal material, such as an aluminum material.

The exhaust pipe 17E is provided such as to extend through the filters 17B1, 17B2 between the filters 17B1, 17B2 and to establish communication between the one end side and the other end side of the air dryer 17. The exhaust pipe 17E communicates at one end side with an exhaust port 19 through an exhaust valve 20 to be described later, and communicates at the other end side with a space between the filter 17B2 and the cylinder head 14. Through the exhaust pipe 17E, compressed air (compressed air in an undried state without having moisture adsorbed by the drying agent 17C) flows toward the exhaust port 19 in a direction in which the compressed air is exhausted into the atmosphere outside.

A supply-and-exhaust port 18 is located on the one end side of the air dryer 17 and provided on one side in a circumferential direction at a bottom of the housing 17A. The supply-and-exhaust port 18 is connected to a supply-and-exhaust pipeline 22 to be described later, and through the supply-and-exhaust port 18, compressed air compressed in the compression chamber 10B is supplied toward the air suspensions 21 in a state of having been dried in the air dryer 17, or compressed air in a dry state exhausted from the air suspensions 21 is discharged into the housing 17A of the air dryer 17.

On the other hand, the exhaust port 19 is located on the one end side of the air dryer 17 and provided on the other side in the circumferential direction at the bottom of the housing 17A. The exhaust port 19 is a connected to an exhaust pipeline 26 to be described later, and compressed air from the exhaust pipe 17E is exhausted through the exhaust port 19 toward the outside. Here, the exhaust valve 20 is provided between the exhaust port 19 and the exhaust pipe 17E.

Figure 2:
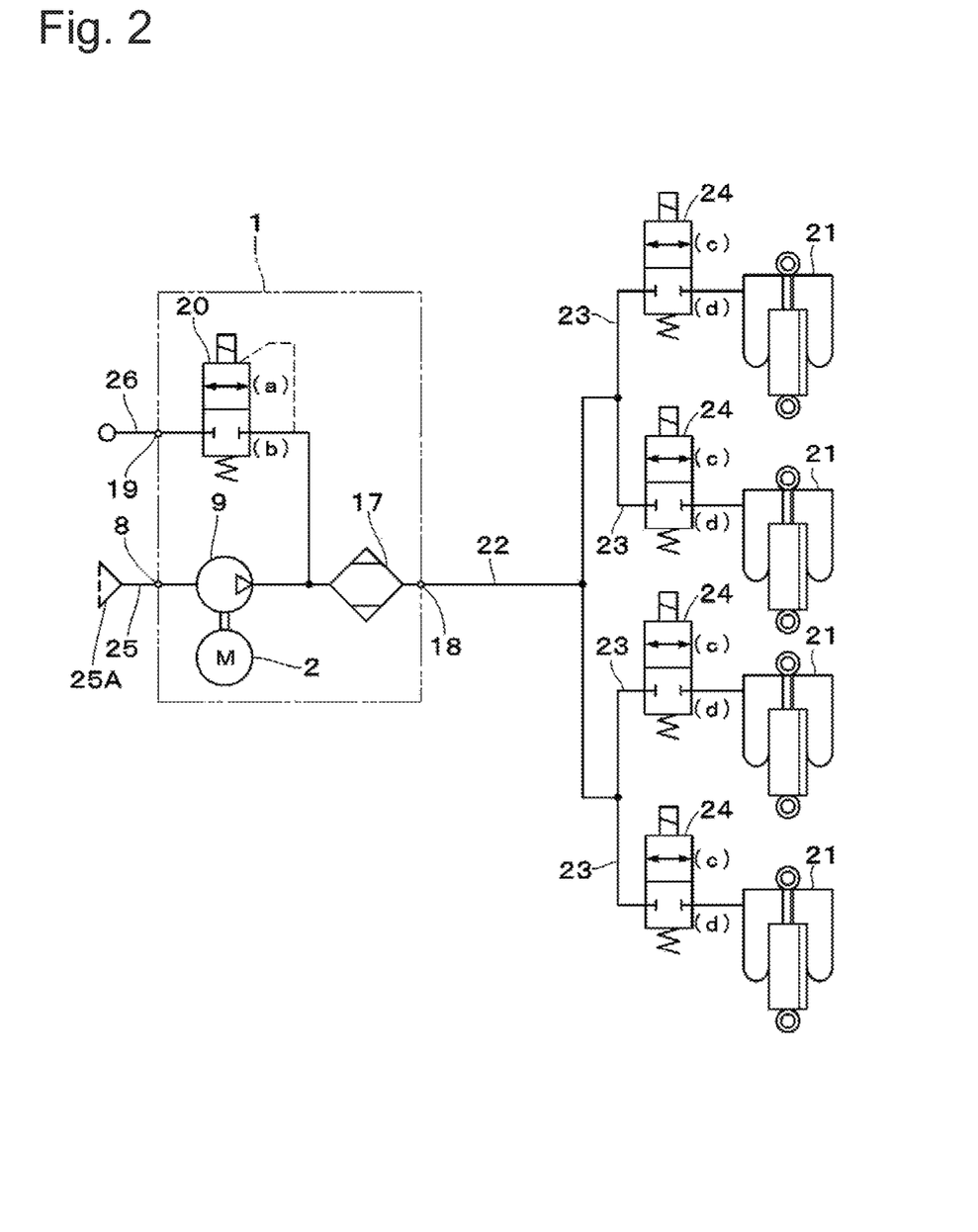
FIG. 2 is a pneumatic circuit diagram showing an air suspension mechanism using the compressor.

The exhaust valve 20 is a valve that establish and blocks communication of the exhaust port 19 connected to the exhaust pipeline 26 with the atmosphere (outside air). The exhaust valve 20 is formed by an on-off (open-close) solenoid valve and connected to the controller 27 to be described later. Specifically, the exhaust valve 20 is selectively switched by the controller 27 between an open position (a) in which the exhaust port 19 is opened to allow discharge of the compressed air from the exhaust pipe 17E, and a closed position (b) in which the exhaust port 19 is closed to block the discharge of compressed air from the exhaust pipe 17E. The exhaust valve 20 is normally closed and blocks the exhaust pipe 17E from the exhaust port 19. When opened, the exhaust valve 20 establishes communication between the exhaust pipe 17E and the exhaust port 19 to cause compressed air inside the exhaust pipe 17E to be discharged (released) through the exhaust port 19 and the exhaust pipeline 26 into the atmosphere.

Four air suspensions 21 serving as air springs are provided between the side of axles of the vehicle and the side of a vehicle body (neither is shown) such as to correspond respectively to front-right, front-left, rear-right, and rear-left wheels (neither is shown) of the vehicle. Alternatively, the air suspensions 21 may be provided only on a front wheel side or a rear wheel side of the vehicle. The air suspensions 21 constitute the pressure device of the present invention, and a working fluid (compressed air) compressed in the compression chamber 10B of the compressor 1 is supplied to the air suspensions 21.

Specifically, when compressed air is supplied to or exhausted from the air suspensions 21, the air suspensions 21 adjust the height of the vehicle by expanding upward or contracting downward according to the amount (of compressed air) supplied or exhausted, and thus supports the vehicle body so as to be movable upward and downward. Each air suspension 21 is connected to the compressor 1 through the supply-and-exhaust pipeline 22 and a branch pipeline 23.

One end side of the supply-and-exhaust pipeline 22 located on an upstream side is connected to the supply-and-exhaust port 18 of the compressor 1, and the other end side thereof located on a downstream side is connected to each branch pipeline 23. Compressed air is supplied to and exhausted from the air suspensions 21 through the supply-and-exhaust pipeline 22 and the branch pipelines 23.

A supply-and-exhaust valve 24 is located between each air suspension 21 and the compressor 1 and provided at an intermediate point of the branch pipeline 23. Being almost the same as the exhaust valve 20, the supply-and-exhaust valve 24 is formed by an on-off solenoid valve and connected to the controller 27 to be described later. Specifically, the supply-and-exhaust valve 24 is selectively switched through control by the controller 27 between an open position (c) in which each of the branch pipelines 23 is opened to allow supply and discharge of compressed air to and from each of the air suspension 21, and a closed position (d) in which each of the branch pipeline 23 is closed to block supply and discharge of compressed air to and from each of the air suspension 21.

The suction pipeline 25 is connected to the suction port 8 of the compressor 1. The suction pipeline 25 communicates with the atmosphere at all times, and air suctioned through an intake air filter 25A flows through the suction pipeline 25 into the compressor 1.

On the other hand, the exhaust pipeline 26 is connected to the exhaust port 19 of the compressor 1. The exhaust pipeline 26 communicates with the atmosphere at all times and, when the exhaust valve 20 opens, communicates with the exhaust pipe 17E through the exhaust port 19 to cause compressed air inside the exhaust pipe 17E to be discharged (released) into the atmosphere.

Figure 3:
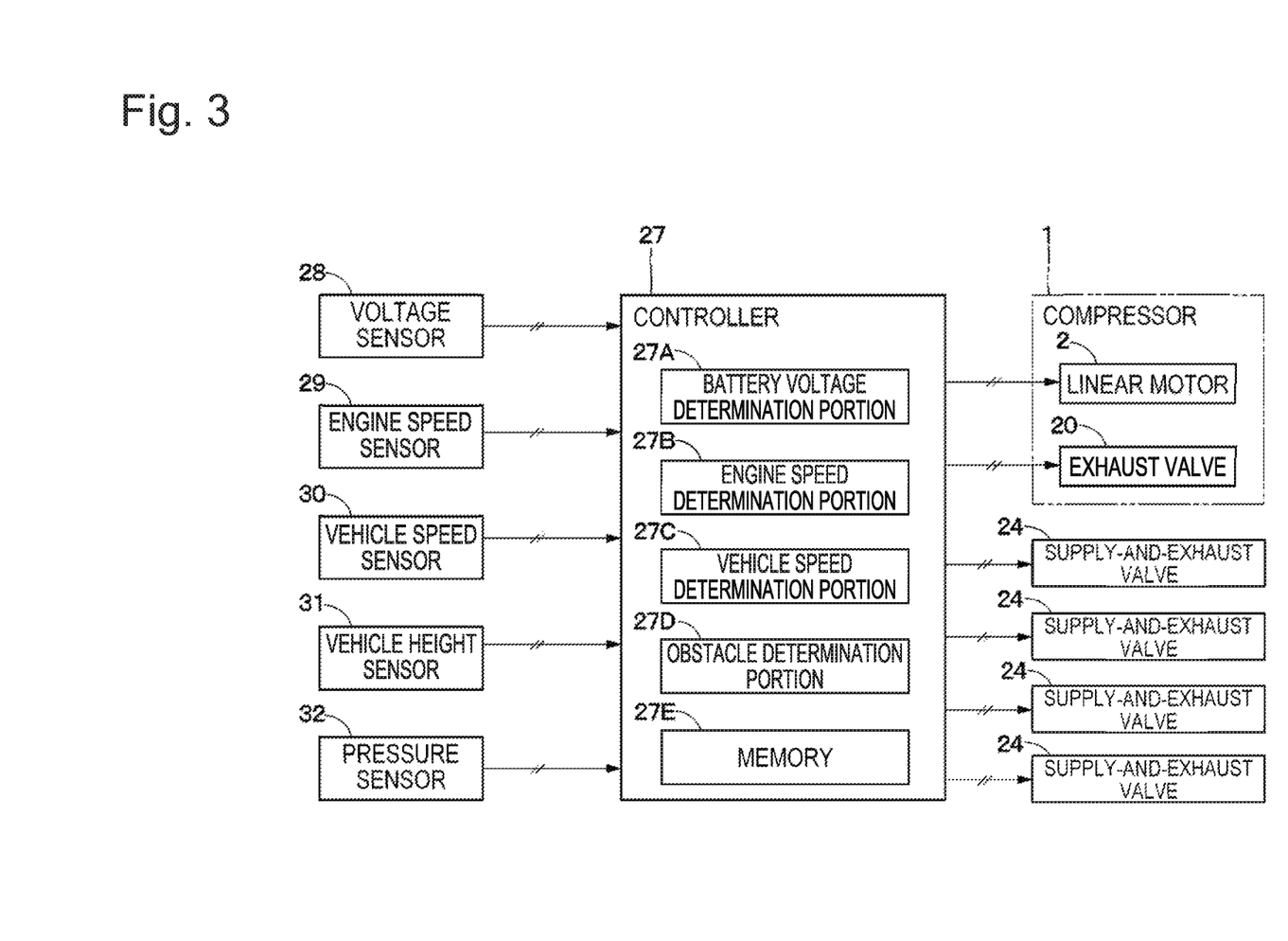
FIG. 3 is a configuration diagram showing the electric configuration of an in-vehicle compression device.

The controller 27 is installed in a vehicle and controls driving of the linear motor 2 according to the state (driving state) of the vehicle. The controller 27 constitutes the in-vehicle compression device of the present invention along with the compressor 1. A voltage sensor 28 as a battery voltage detection portion that detects a battery voltage of a battery (not shown) installed in the vehicle, an engine speed sensor 29 that detects a speed of an engine (not shown), a vehicle speed sensor 30 that detects a running speed of the vehicle, a vehicle height sensor 31 that detects a height dimension of the vehicle (vehicle height), and pressure sensors 32 that detect air pressures acting on the air suspensions 21, are connected to an input side of the controller 27. In this case, the engine speed sensor 29 constitutes the engine speed detection portion of the present invention, and the vehicle speed sensor 30 constitutes the speed detection portion of the present invention. For example, the pressure sensors 32 are provided on the air suspensions 21, and the vehicle height sensor 31 is provided on the vehicle body, and these sensors 31, 32 constitute the obstacle detection portion of the present invention.

On the other hand, the linear motor 2 (the coils 5B of the armature 5) of the compressor 1, the exhaust valve 20 of the compressor 1, and the supply-and-exhaust valves 24 provided respectively in the branch pipelines 23, are connected to an output side of the controller 27. Specifically, for example, when it is determined that the vehicle height need be adjusted based on the state (driving state) of the vehicle, and when a driver has manipulated a vehicle height adjustment switch (not shown), the controller 27 controls the linear motor 2, the exhaust valve 20, and the supply-and-exhaust valves 24 to expand upward or contract downward the air suspensions 21.

The controller 27 includes a battery voltage determination portion 27A, an engine speed determination portion 27B, a vehicle speed determination portion 27C, an obstacle determination portion 27D, and a memory 27E. Based on a detection signal output from the voltage sensor 28, the battery voltage determination portion 27A determines whether a battery voltage value V is equal to or higher than a voltage threshold value VL (predetermined voltage value VL) stored in advance in the memory 27E. In this case, the voltage threshold value VL can be set to be equal to or higher than a voltage value that is required to cause the movable element 6 to travel the full length of stroke. The battery voltage falls below the voltage threshold value VL, for example, due to deterioration with age, or in the case of an electric vehicle, when the battery charge level decreases as the vehicle runs and thus the charge level has become low.

Based on a detection signal output from the engine speed sensor 29, the engine speed determination portion 27B determines whether an engine speed N is equal to or higher than an engine speed threshold value NL (predetermined engine speed NL) stored in advance in the memory 27E. In this case, the engine speed threshold value NL can be set by using, for example, an experimental value based on noise performance of the engine or noise performance of the vehicle.

Based on a detection signal output from the vehicle speed sensor 30, the vehicle speed determination portion 27C determines whether a vehicle speed S is equal to or higher than a vehicle speed threshold value SL (predetermined vehicle speed SL) stored in advance in the memory 27E. In this case, the vehicle speed threshold value SL can be set by using, for example, an experimental value based on noise performance (noise of contact between a road surface and tires, wind noise, etc. occurring while the vehicle is running; hereinafter referred to as road noise) corresponding to the running speed of the vehicle. That is, the road noise usually increases as the running speed of the vehicle increases. Therefore, the vehicle speed determination portion 27C determines the road noise based on the running speed of the vehicle.

Based on detection signals output from the vehicle height sensor 31 and the pressure sensors 32, the obstacle determination portion 27D determines whether there is any obstacle in upward and downward directions of the vehicle. In this case, the obstacle determination portion 27D determines whether there is any obstacle in the upward and downward directions of the vehicle by observing changes over time in detection value of the vehicle height sensor 31 and in detection value of the pressure sensors 32.

Specifically, the obstacle determination portion 27D can determine that there is an obstacle below the vehicle (in contact with the vehicle), for example, when the detection values of the pressure sensors 32 decrease significantly while the detection value of the vehicle height sensor 31 is fixed at a constant value for a predetermined time. Or the obstacle determination portion 27D can determine that there is an obstacle above the vehicle (in contact with the vehicle), for example, when the detection values of the pressure sensors 32 increase significantly while the detection value of the vehicle height sensor 31 is fixed at a constant value for a predetermined time.

For example, the memory 27E is formed by a flash memory, ROM, RAM, EEPROM, or the like. In addition to a processing program for determining whether there is any obstacle in the upward and downward directions of the vehicle as described above, a processing program for executing the process flow shown in FIG. 4, i.e., a processing program for determining whether to cause the movable element 6 of the linear motor 2 to make full strokes or shorter strokes is stored in the memory 27E. Moreover, various predetermined values (voltage threshold value VL, engine speed threshold value NL, and vehicle speed threshold value SL) used in the processing program are stored in the memory 27E. Furthermore, the state of the vehicle, i.e., the battery voltage value V, engine speed N, vehicle speed S, and presence or absence of an obstacle (vehicle height and air pressure), is successively stored (saved) in an updatable manner.

The in-vehicle compression device according to this embodiment has the configuration as has been described above. Next, the operation of this in-vehicle compression device will be described.

First, when a current is applied to the coils 5B of the armature 5 of the linear motor 2, the permanent magnets 6B of the movable element 6 receive a thrust force in the axial direction and cause the entire movable element 6 to travel toward the one end side of the compressor 1. Meanwhile, the spring 7 is contracted, so that when the direction of the current is reversed, the movable element 6 travels toward the other end side of the compressor 1 under the urging force of the spring 7. The thrust force of the reciprocating movable element 6 is transmitted to the piston 11 through the coupling member 11B. Then, the piston 11 reciprocates inside the cylinder 10, alternatingly repeating a suction stroke in which the piston 11 comes away from the cylinder head 14 and a compression stroke in which the piston 11 comes closer to the cylinder head 14.

In this case, during a suction stroke of the piston 11, the intake valve 12 opens when a negative pressure has prevailed inside the compression chamber 10B. As a result, the non-compression chamber 10A and the compression chamber 10B communicate with each other through the communication hole 11C provided in the piston 11, so that outside air flowing from the suction port 8 of the motor case 3 into the non-compression chamber 10A through the inside of the motor case 3 is suctioned via the communication hole 11C into the compression chamber 10B.

On the other hand, during a compression stroke of the piston 11, the discharge valve 16 opens when the pressure inside the compression chamber 10B has risen and becomes higher than a pressure at which the discharge valve 16 is set to open. As a result, compressed air inside the compression chamber 10B flows into the air dryer 17. In the air dryer 17, the compressed air comes into contact with the drying agent 17C and thereby has moisture adsorbed and removed, and the compressed air thus dried is supplied through the supply-and-exhaust port 18 toward the air suspensions 21.

Here, to supply the compressed air to the air suspensions 21 and raise the vehicle height by the air suspensions 21, the supply-and-exhaust valves 24 are switched from the closed position (d) to the open position (c). When the compressor 1 is operated in this state, the compressed air is supplied to the air suspensions 21 through the supply-and-exhaust pipeline 22 and the branch pipelines 23. After completion of the vehicle height raising operation, the supply-and-exhaust valves 24 are switched to the closed position (d) to close the branch pipelines 23. With the flow of compressed air to the air suspensions 21 thus blocked, the air suspensions 21 can be kept in an expanded state to keep the vehicle in a raised state.

On the other hand, to lower the vehicle height, the supply-and-exhaust valves 24 are switched to the open position (c) and the exhaust valve 20 is switched from the closed position (b) to the open position (a). Thus, the compressed air inside the air suspensions 21 is led out into the compressor 1 through the branch pipelines 23 and the supply-and-exhaust pipeline 22. The compressed air flowing through the supply-and-exhaust port 18 into the compressor 1 flows backward inside the air dryer 17 and takes away the moisture having been adsorbed by the drying agent 17C, and thereby regenerates the drying agent 17C. Then, the compressed air is discharged (released) to the outside through the exhaust pipe 17E, the exhaust valve 20, the exhaust port 19, and the exhaust pipeline 26. As a result, the compressed air is discharged from the air suspensions 21 and the air suspensions 21 shift to a contracted state, and thus the vehicle height can be lowered.

If the battery supply voltage becomes low, for example, as another electric device connected to the battery is operated, when the engine speed is low or the engine is stopped, the above-described prior art may fail to operate the compressor 1.

In this embodiment, therefore, the linear motor 2 is used for the compressor 1. In this case, shortening (reducing) the stroke of the movable element 6 of the linear motor 2 allows the compressor 1 to operate even at a low battery supply voltage. Moreover, shortening the stroke of the movable element 6 allows the compressor 1 to operate with low vibration and low noise.

Next, whether to cause the movable element 6 to make full strokes or shorter strokes will be described based on the control process shown in FIG. 4. The control process shown in FIG. 4 is executed, for example, after the controller of the vehicle determines that the vehicle height need be adjusted or after the driver has turned on the vehicle height adjustment switch, and executed repeatedly in predetermined cycles until adjustment of the vehicle height is completed.

Figure 4:
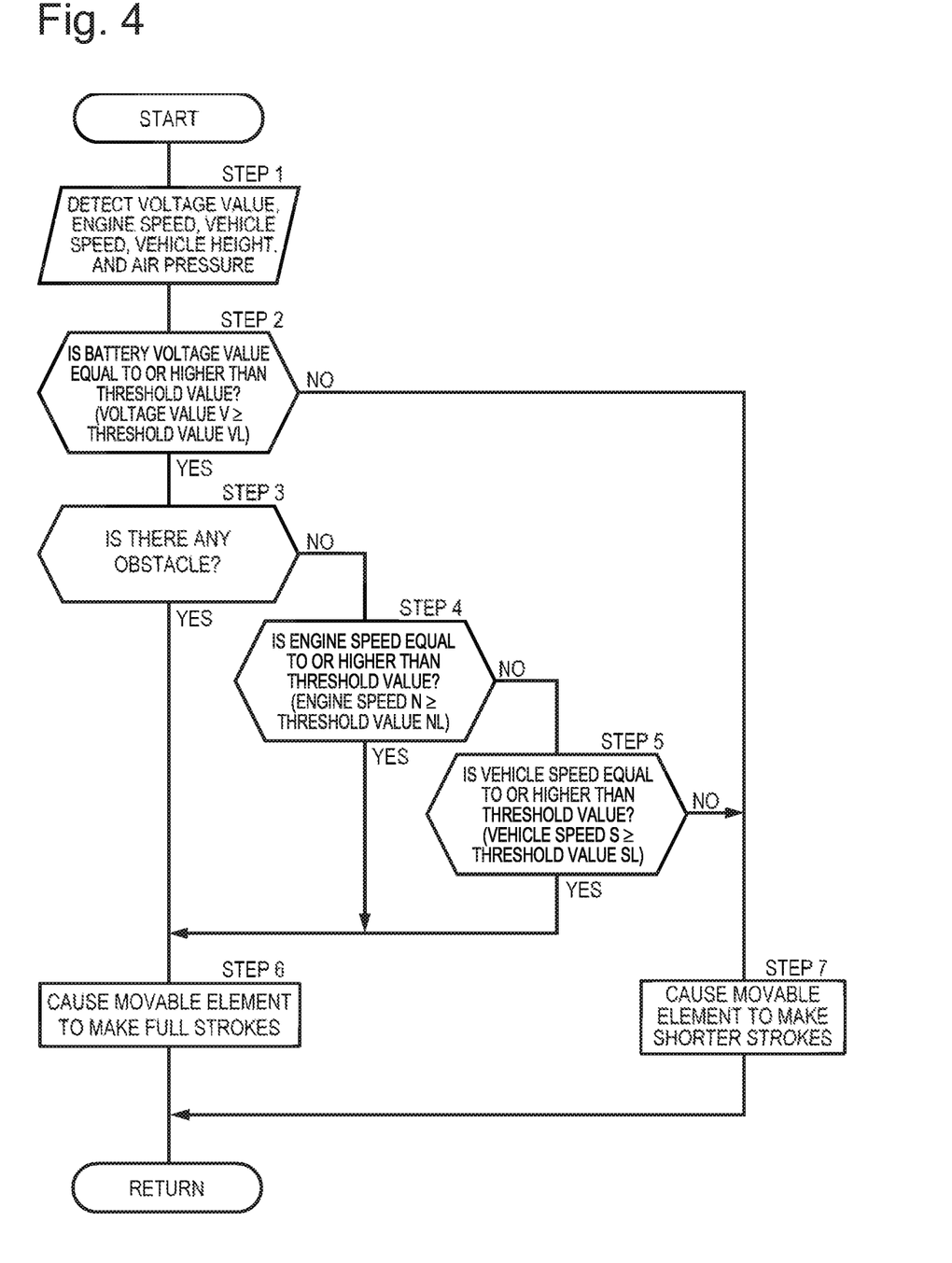
FIG. 4 is a flowchart showing a control process performed by a controller in FIG. 3.

When the processing operation of FIG. 4 is started, the controller 27 detects in step 1 the battery voltage value V output from the voltage sensor 28, the engine speed N output from the engine speed sensor 29, the vehicle speed S output from the vehicle speed sensor 30, the vehicle height output from the vehicle height sensor 31, and the air pressures acting on the air suspensions 21 output from the pressure sensors 32. These detection values are stored in the memory 27E of the controller 27 in an updatable manner.

In the next step 2, the controller 27 determines whether the battery voltage value V is equal to or higher than the voltage threshold value VL (voltage value V threshold value VL). Specifically, the battery voltage determination portion 27A of the controller 27 determines whether the battery has a sufficient voltage value to cause the movable element 6 to travel the full length of stroke. When the determination result in step 2 is YES, i.e., when it is determined that the voltage value V is equal to or higher than the threshold value VL, the process proceeds to step 3. On the other hand, when the determination result in step 2 is NO, i.e., when it is determined that the voltage value V is lower than the threshold value VL, the process proceeds to step 7.

In step 3, the controller 27 determines whether there is any obstacle. Specifically, the obstacle determination portion 27D of the controller 27 determines whether there is any obstacle above or below the vehicle. More specifically, the obstacle determination portion 27D can determine that there is an obstacle below the vehicle (in contact with the vehicle), for example, when the detection values of the pressure sensors 32 decrease significantly while the detection value of the vehicle height sensor 31 is fixed at a constant value for a predetermined time. Or the obstacle determination portion 27D can determine that there is an obstacle above the vehicle (in contact with the vehicle), for example, when the detection values of the pressure sensors 32 increase significantly while the detection value of the vehicle height sensor 31 is fixed at a constant value for a predetermined time.

In this case, when it is determined that there is an obstacle above the vehicle, this means that the air suspensions 21 have made an expanding action. The vehicle height need be lowered when there is an obstacle above the vehicle. Therefore, when it is determined that there is an obstacle above the vehicle, the process proceeds to another control process (not shown). Specifically, the controller 27 stops the expanding action of the air suspensions 21 (stops the operation of the compressor 1), and then switches the supply-and-exhaust valves 24 to the open position (c) and switches the exhaust valve 20 from the closed position (b) to the open position (a). As a result, the compressed air is discharged from the air suspensions 21 and the air suspensions 21 shift to a contracted state, and thus the vehicle height can be lowered.

When the determination result in step 3 is YES, i.e., when it is determined that there is an obstacle below the vehicle, the process proceeds to step 6. On the other hand, when the determination result in step 3 is NO, i.e., when it is determined that there is no obstacle (no obstacle is detected), the process proceeds to step 4.

In step 4, the controller 27 determines whether the engine speed N is equal to or higher than the engine speed threshold value NL (engine speed N threshold value NL). Specifically, the engine speed determination portion 27B of the controller 27 determines whether engine driving noise based on the engine speed N is larger than driving noise of the compressor 1 occurring when the movable element 6 of the compressor 1 travels the full length of stroke. When the determination result in step 4 is YES, i.e., when it is determined that the engine speed N is equal to or higher than the threshold value NL, the process proceeds to step 6. On the other hand, when the determination result in step 4 is NO, i.e., when it is determined that the engine speed N is lower than the threshold value NL, the process proceeds to step 5.

In step 5, the controller 27 determines whether the vehicle speed S is equal to or higher than the vehicle speed threshold value SL (vehicle speed S threshold value SL). Specifically, the vehicle speed determination portion 27C of the controller 27 determines, based on the vehicle speed, whether the road noise based on the vehicle speed S is larger than the driving noise of the compressor 1 occurring when the movable element 6 of the compressor 1 travels the full length of stroke. When the determination result in step 5 is YES, i.e., when it is determined that the vehicle speed S is equal to or higher than the threshold value SL, the process proceeds to step 6. On the other hand, when the determination result in step 5 is NO, i.e., when it is determined that the vehicle speed S is lower than the threshold value SL, the process proceeds to step 7.

In step 6, the controller 27 causes the movable element 6 to make full strokes. Specifically, the controller 27 supplies a current to the coils 5B of the armature 5 such that the element 6 makes full strokes. As a result, compressed air can be quickly supplied from the compressor 1 to the air suspensions 21, and thus the vehicle height can be promptly raised.

Accordingly, when there is an obstacle below the vehicle (YES in step 3), collision with that obstacle can be quickly avoided. When the engine speed N is equal to or higher than the threshold value NL (YES in step 4) and/or the vehicle speed S is equal to or higher than the threshold value SL (YES in step 5), noise inside the vehicle (engine driving noise, road noise, etc.) is large to some extent. Therefore, even when the movable element 6 of the compressor 1 makes full strokes, the responsiveness of the air suspensions 21 can be enhanced to promptly raise the vehicle height, without making the driving noise of the compressor 1 noticeable.

In step 7, the controller 27 causes the movable element 6 to make shorter strokes. Specifically, the controller 27 supplies a current to the coils 5B of the armature 5 such that the movable element 6 makes shorter strokes. In this case, to cause the movable element 6 to make shorter strokes, for example, the value of the current passing through the coils 5B of the armature 5 can be changed so as to adjust the bottom dead center of the movable element 6 without changing the top dead center thereof, or to adjust the top dead center and the bottom dead center of the movable element 6.

This allows the compressor 1 to be driven at a low current and with low vibration and low noise. Thus, even when the battery supply voltage is low (NO in step 2), causing the movable element 6 to make shorter strokes can drive the compressor 1 at a low current, and thus raise the vehicle height.

When the engine speed N is lower than the threshold value NL (NO in step 4) and the vehicle speed S is lower than the threshold value SL (NO in step 5), quietness in the surroundings (the inside) of the vehicle is maintained. Therefore, the controller 27 causes the movable element 6 to make shorter strokes even when the battery has the voltage value V to allow the movable element 6 to make full strokes. This can reduce vibration of the movable element 6 and thus reduce the driving noise of the compressor 1, so that the vehicle height can be adjusted while quietness inside the vehicle is maintained.

The above embodiment has been illustrated with the example in which whether to cause the movable element 6 to make shorter strokes is determined through the determination of presence or absence of an obstacle in step 3, the determination of the engine speed N in step 4, and the determination of the vehicle speed S in step 5. However, the present invention is not limited to this example. For example, the engine speed N may be determined in step 3, and then the vehicle speed S may be determined in step 4 and presence or absence of an obstacle may be determined in step 5. Namely, step 3 to step 5 can be performed in any order.

Figure 5:
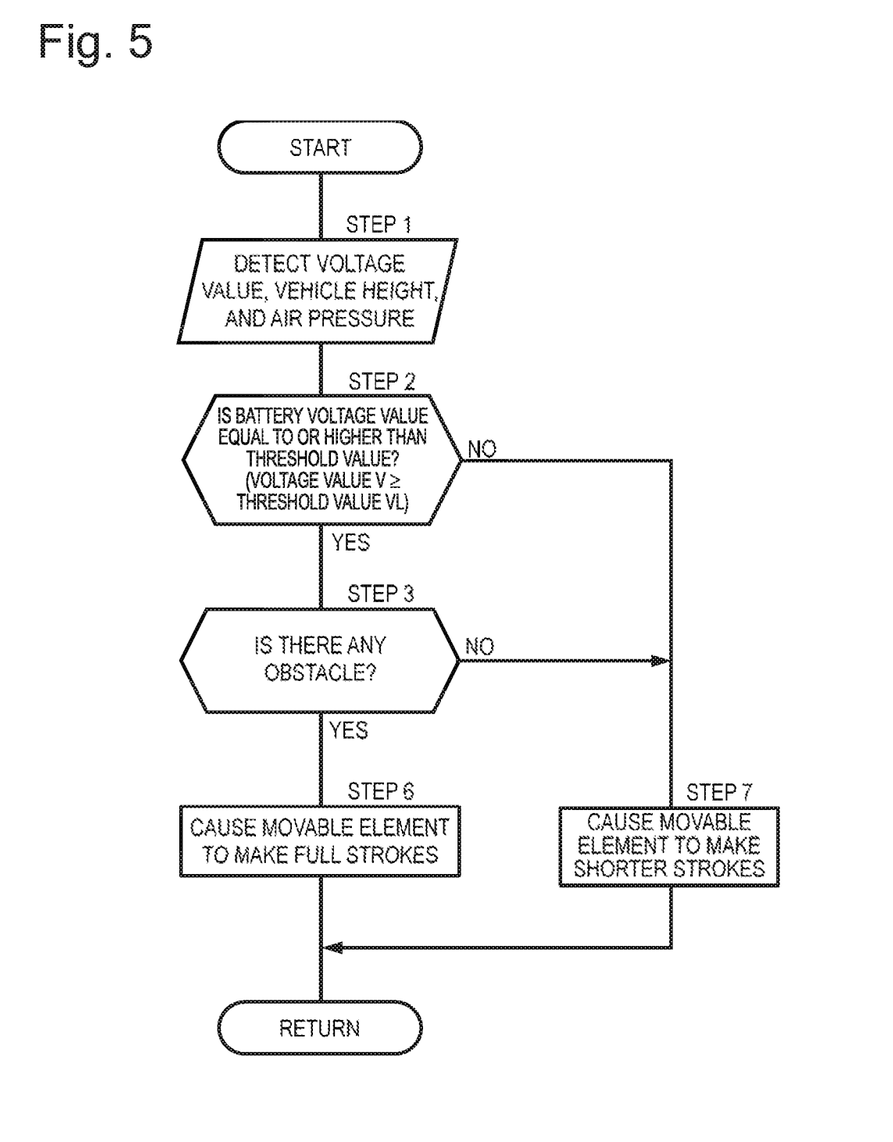
FIG. 5 is a flowchart showing a control process according to a first modification.

The above embodiment has been illustrated with the example in which whether to cause the movable element 6 to make shorter strokes is determined through the determination of presence or absence of an obstacle in step 3, the determination of the engine speed N in step 4, and the determination of the vehicle speed S in step 5. However, the present invention is not limited to this example. For example, as in a first modification shown in FIG. 5, the length of stroke of the movable element 6 may be decided through only the determination of presence or absence of an obstacle, without the determination of the engine speed N and the determination of the vehicle speed S.

Figure 6:
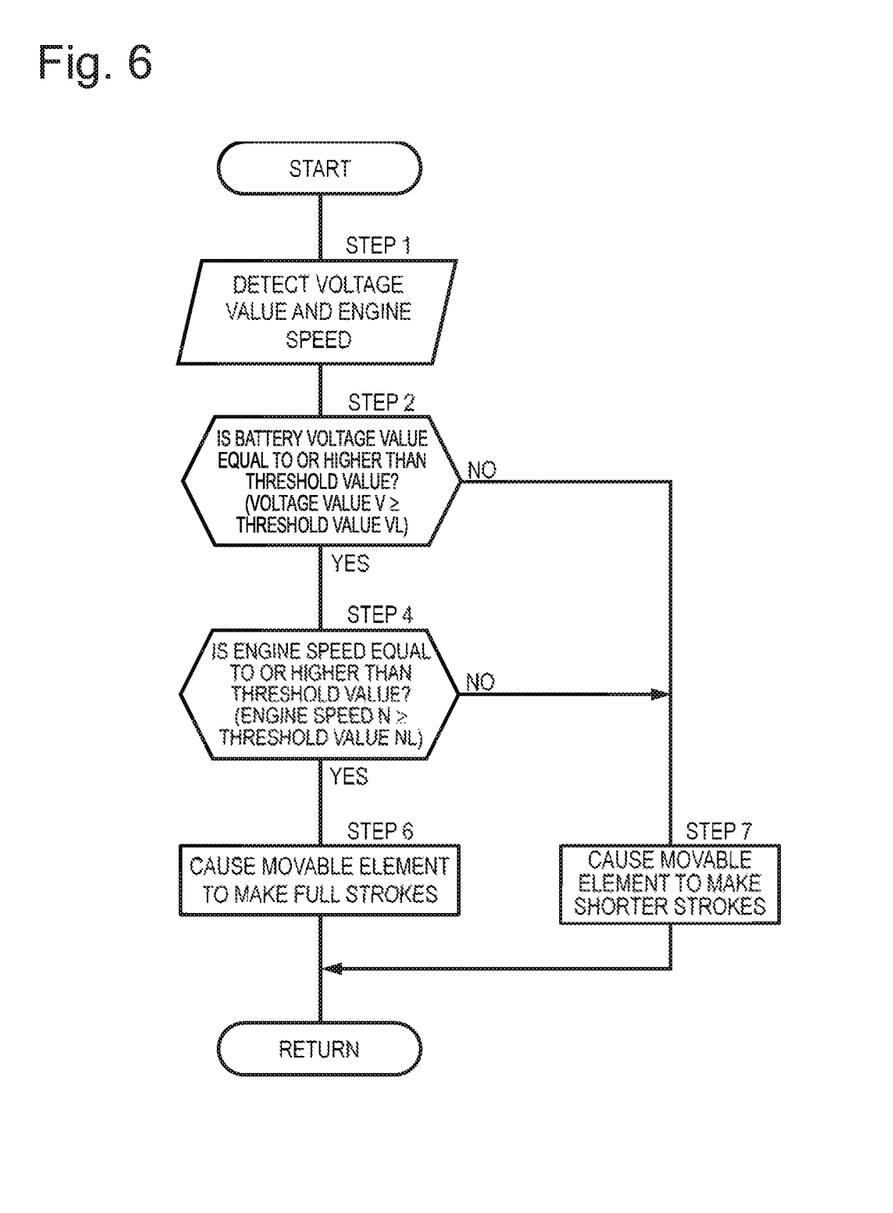
FIG. 6 is a flowchart showing a control process according to a second modification.
Figure 7:
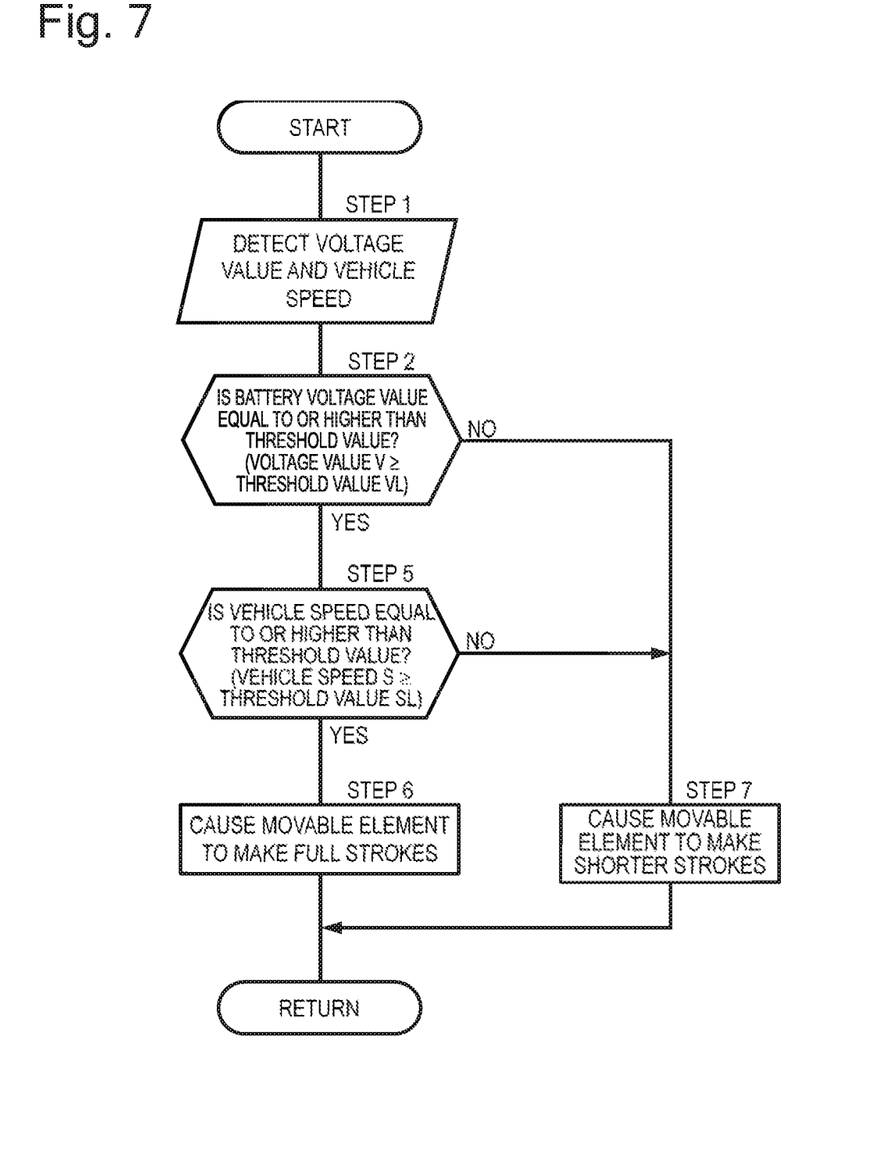
FIG. 7 is a flowchart showing a control process according to a third modification.

Further, as in a second modification shown in FIG. 6, the length of stroke of the movable element 6 may be decided through only the determination of the engine speed N, without the determination of presence or absence of an obstacle and the determination of the vehicle speed S. Moreover, as in a third modification shown in FIG. 7, the length of stroke of the movable element 6 may be decided through only the determination of the vehicle speed S, without the determination of presence or absence of an obstacle and the determination of the engine speed N.

In the above embodiment, the compressor 1 is used for an open-type air suspension mechanism that does not use a compressed air storage tank and that suctions and exhausts outside air. However, the present invention is not limited to this example. For example, the compressor 1 may be used for a closed-type air suspension mechanism that uses a compressed air storage tank. The compressor 1 is also applicable to an open-type air suspension mechanism that uses a tank.

If the compressor 1 is used for a closed-type air suspension mechanism, the controller 27 can move the process to step 6 and determine to cause the movable element 6 to make full strokes, also when it is determined that there is an obstacle above the vehicle as a result of the determination of whether there is any obstacle in step 3 of FIG. 4. Thus, when it is determined that there is an obstacle above the vehicle, the movable element 6 can be caused to travel the full length of stroke to thereby promptly contract the air suspensions. The same applies also to the first modification.

The above embodiment has been illustrated with the example in which whether there is any obstacle is determined by observing changes over time in detection value of the vehicle height sensor 31 and in detection values of the pressure sensors 32. However, the present invention is not limited to this example. For example, an obstacle detection device (obstacle detection portion) formed by a plurality of clearance sonars, millimeter-wave radars, or the like may be provided on the vehicle body, and an obstacle may be detected using this obstacle detection device.

The above embodiment has been illustrated with the example in which two-level selective control of either causing the movable element 6 to travel the full length of stroke or a shorter length of stroke is adopted. However, the present invention is not limited to this example. For example, the length of stroke of the movable element 6 may be switched among multiple levels or continuously according to the state of the vehicle.

The above embodiment has been illustrated with the example in which the battery voltage value V, the engine speed N, and the vehicle speed S are used as the state of the vehicle. However, the present invention is not limited to this example. For example, a gear position and/or an on/off state of a brake switch may be used as the state of the vehicle. In this case, for example, when the gear position is parking or neutral, the vehicle can be regarded as stationary and the movable element 6 can be caused to travel a shorter length of stroke. When the brake switch is on, i.e., the brake is applied, the vehicle can be regarded as stationary and the movable element 6 can be caused to travel a shorter length of stroke.

For example, the following aspects are conceivable as those of the in-vehicle compression device based on the embodiments having been described above.

According to a first aspect, an in-vehicle compression device includes: a compressor including a cylinder and a piston that is slidably provided inside the cylinder and defines a compression chamber; a linear motor including a movable element reciprocatably connected to the piston; and a controller configured to control driving of the linear motor. The in-vehicle compression device is configured to supply a working fluid compressed in the compression chamber to a pressure device provided in a vehicle, and the controller is configured to variably adjust a stroke of the piston according to a state of the vehicle.

According to a second aspect, in the first aspect, the controller is configured to adjust a bottom dead center of the movable element without changing a top dead center thereof.

According to a third aspect, in the first aspect, the controller is configured to adjust a top dead center and a bottom dead center of the movable element.

According to a fourth aspect, in any one of the first to third aspects, the state of the vehicle includes an engine speed of the vehicle. The in-vehicle compression device further includes an engine speed detection portion detect the engine speed of the vehicle. The controller is configured to adjust the stroke of the piston to be shorter when the engine speed detected by the engine speed detection portion is lower than a predetermined engine speed.

According to a fifth aspect, in any one of the first to fourth aspects, the in-vehicle compression device further includes a vehicle speed detection portion configured to detect a speed of the vehicle. The controller is configured to adjust the stroke of the piston to be shorter when the speed of the vehicle detected by the vehicle speed detection portion is lower than a predetermined vehicle speed.

According to a sixth aspect, in any one of the first to fifth aspects, the in-vehicle compression device includes an obstacle detection portion configured to detect presence or absence of an obstacle located above or below the vehicle. The controller is configured to adjust the stroke of the piston to be shorter when no obstacle is detected by the obstacle detection portion.

According to a seventh aspect, in any one of the first to sixth aspects, the state of the vehicle includes a battery voltage of the vehicle. The in-vehicle compression device further includes a battery voltage detection portion configured to detect the battery voltage of the vehicle. The controller is configured to adjust the stroke of the piston to be shorter when the battery voltage detected by the battery voltage detection portion is lower than a predetermined voltage value.

According to an eighth aspect, in any one of the first to sixth aspects, the state of the vehicle includes a battery voltage of the vehicle. The in-vehicle compression device further includes a battery voltage detection portion configured to detect the battery voltage of the vehicle. The controller is configured to adjust the stroke of the piston to be shorter when a charge level of the battery voltage detected by the battery voltage detection portion is low.

While some embodiments of the present invention have been described above, these embodiments of the invention are intended to help understand the invention and not to limit the invention. The present invention can be modified or improved without departing from the spirit thereof, and includes equivalents thereof. The components described in the claims and the specification can be combined or omitted as appropriate, to such an extent that at least some of the above-described problems can be solved or to such an extent that at least some of the effects can be achieved.

REFERENCE SIGNS LIST

1 Compressor, 2 Linear motor, 6 Movable element, 10 Cylinder, 10B Compression chamber, 11 Piston, 21 Air suspension (pressure device), 27 Controller, 28 Voltage sensor (battery voltage detection portion), 29 Engine speed sensor (engine speed detection portion), 30 Vehicle speed sensor (vehicle speed detection portion), 31 Vehicle height sensor (obstacle detection portion), 32 Pressure sensor (obstacle detection portion)

The invention claimed is:

1. An in-vehicle compression device comprising:
a compressor including a cylinder and a piston that is slidably provided inside the cylinder and defines a compression chamber;
a linear motor including a movable element reciprocatably connected to the piston; and
a controller configured to control driving of the linear motor,
wherein:
the in-vehicle compression device is configured to supply a working fluid compressed in the compression chamber to a pressure device provided in a vehicle;
the controller includes a battery voltage detection portion configured to detect a battery voltage of the vehicle and an engine speed detection portion configured to detect an engine speed of the vehicle;
the controller is configured to change a top dead center of the movable element and a bottom dead center of the movable element to adjust a stroke of the piston to be shorter to drive the linear motor such that a load applied to the linear motor is decreased, in a case where the battery voltage detected by the battery voltage detection portion is lower than a predetermined voltage; and
the controller is configured to set the stroke of the piston to be shorter such that a linear motor driving noise is decreased, when the engine speed detected by the engine speed detection portion is lower than a predetermined engine speed, based on a relationship between an engine driving noise corresponding to the engine speed and the linear motor driving noise corresponding to the stroke of the piston in a case where the battery voltage detected by the battery voltage detection portion is higher than the predetermined voltage.

2. The in-vehicle compression device according to claim 1, further comprising a vehicle speed detection portion configured to detect a speed of the vehicle,
wherein the controller is configured to adjust the stroke of the piston to be shorter when the speed of the vehicle detected by the vehicle speed detection portion is lower than a predetermined vehicle speed.

3. An in-vehicle compression device comprising:
a compressor including a cylinder and a piston that is slidably provided inside the cylinder and defines a compression chamber;
a linear motor including a movable element reciprocatably connected to the piston;
a controller configured to control driving of the linear motor;

an engine speed detection portion configured to detect an engine speed of a vehicle; and an obstacle detection portion configured to detect a presence or an absence of an obstacle located above or below the vehicle, wherein:

the in-vehicle compression device is configured to supply a working fluid compressed in the compression chamber to a pressure device provided in the vehicle;

the controller is configured to set a stroke of the piston to be shorter based on a relationship between an engine driving noise corresponding to the engine speed and a linear motor driving noise corresponding to the stroke of the piston, when the engine speed detected by the engine speed detection portion is lower than a predetermined engine speed; and the controller is configured to adjust the stroke of the piston to be shorter when no obstacle is detected by the obstacle detection portion.

* * * * *